US012580278B2

(12) United States Patent
Dai et al.

(10) Patent No.:  US 12,580,278 B2
(45) Date of Patent:     Mar. 17, 2026

(54) BATTERY CELL AND ELECTRIC APPARATUS

(71) Applicant: Ningde Amperex Technology Limited, Ningde City (CN)

(72) Inventors: ZhiFang Dai, Ningde City (CN); Sen Zhang, Ningde City (CN); Hai Long, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 976 days.

(21) Appl. No.: 17/709,022

(22) Filed: Mar. 30, 2022

(65) Prior Publication Data

US 2022/0352605 A1      Nov. 3, 2022

Related U.S. Application Data

(63) Continuation of application No. PCT/CN2022/073047, filed on Jan. 20, 2022.

(30) Foreign Application Priority Data

Apr. 28, 2021   (CN) .......................... 202110470292.5

(51) Int. Cl.
H01M 50/533          (2021.01)
H01M 10/0525        (2010.01)
(Continued)

(52) U.S. Cl.
CPC ..... H01M 50/533 (2021.01); H01M 10/0525 (2013.01); H01M 10/0587 (2013.01); H01M 50/538 (2021.01)

(58) Field of Classification Search
CPC .......................... H01M 50/533; H01M 50/538
See application file for complete search history.

(56) References Cited

U.S. PATENT DOCUMENTS

2017/0092925 A1      3/2017  Shiu et al.
2019/0067746 A1*    2/2019  Zeng ................. H01M 10/0431
(Continued)

FOREIGN PATENT DOCUMENTS

CN          200953357 Y      9/2007
CN          202871919 U      4/2013
(Continued)

OTHER PUBLICATIONS

CN111261927 English translation. Zhang et al. China. Jun. 9, 2020. (Year: 2020).*

(Continued)

*Primary Examiner* — Christopher P Domone
(74) *Attorney, Agent, or Firm* — WHDA, LLP

(57)           ABSTRACT

A battery cell is formed by winding a first electrode plate, a separator, and a second electrode plate, the first electrode plate includes a first current collector, a first active substance layer disposed on a surface of the first current collector, and at least one first tab; the first active substance layer is provided with a first groove, and the first tab is disposed in the first groove and electrically connected to the first current collector; the second electrode plate includes a second current collector, a second active substance layer disposed on a surface of the second current collector, and at least one second tab; and the second tab and the second current collector are integrally formed.

10 Claims, 10 Drawing Sheets

100

(51) Int. Cl.
    *H01M 10/0587*      (2010.01)
    *H01M 50/538*      (2021.01)

(56)            References Cited

U.S. PATENT DOCUMENTS

| | | | |
|---|---|---|---|
| 2019/0097259 | A1 | 3/2019 | Guo et al. |
| 2019/0393540 | A1 | 12/2019 | Guo |
| 2021/0028497 | A1* | 1/2021 | Zeng ................. H01M 10/0585 |

FOREIGN PATENT DOCUMENTS

| | | | |
|---|---|---|---|
| CN | 104600250 | A | 5/2015 |
| CN | 206098526 | U | 4/2017 |
| CN | 206451767 | U | 8/2017 |
| CN | 107293804 | A | 10/2017 |
| CN | 107302109 | A | 10/2017 |
| CN | 206921962 | U | 1/2018 |
| CN | 111261927 | * | 6/2020 |
| CN | 210994794 | U | 7/2020 |
| CN | 211907568 | U | 11/2020 |
| CN | 212810487 | U | 3/2021 |
| CN | 112687840 | A | 4/2021 |
| CN | 113193163 | A | 7/2021 |
| JP | 2013-214409 | A | 10/2013 |
| JP | 2018-137079 | A | 8/2018 |
| WO | 2017/159094 | A1 | 9/2017 |

OTHER PUBLICATIONS

CN104600250 English translation. Cui et al. China. May 6, 2015. (Year: 2015).*

Office Action dated Feb. 28, 2022, issued in counterpart CN Application No. 202110470292.5, with English Translation. (12 pages).

International Search Report dated Apr. 28, 2021, issued in Application No. PCT/CN2022/073047. (4 pages).

Notice of Allowance dated Jul. 4, 2022, issued in counterpart CN Application No. 202110470292.5. (4 pages).

Extended (Suuplementary) European Search Report dated May 15, 2023, issued in EP Application No. 22711851.0. (6 pages).

* cited by examiner

100

10

<u>10</u>

10

100

100

103   303   30   10

α   50

Y

X

100

BATTERY CELL AND ELECTRIC APPARATUS

CROSS-REFERENCE TO RELATED APPLICATIONS

This application claims priority to Chinese Patent Application No. 202110470292.5 filed on Apr. 28, 2021, the content of which is incorporated herein by reference.

TECHNICAL FIELD

This application relates to the field of battery technologies, and in particular, to a battery cell and an electric apparatus.

BACKGROUND

After a current collector is coated with an active substance layer, a groove is dug into the active substance layer to expose a bare current collector. A tab is welded onto the bare current collector, and such a tab is usually referred to as an embedded tab. With use of the embedded tab, it is unnecessary to reserve an uncoated region for welding a tab on an electrode plate, which improves an energy density of a battery cell. Generally, an embedded single-tab structure is arranged on an anode electrode plate, but the embedded single-tab structure causes the current channel to be congested, the internal resistance of the battery cell to be too large, and the charging temperature to rise, which cannot meet the temperature rise requirement for charging at 5C or above.

After the current collector is coated with the active substance layer, the bare current collector at the edge of the electrode plate is die-cut to form a tab (which means that the tab and the current collector are integrally formed). Such a tab is generally referred to as an external tab, which can significantly reduce the internal resistance, and satisfy a temperature rise demand during charging/discharging at a high rate. In the prior art, generally the bare current collector at the edge of a cathode electrode plate is provided with an insulation coating to prevent fins from being generated when the tab is formed by die-cutting. The tail of the cathode tab is also provided with an insulation coating to prevent a short circuit caused by contact between the cathode tab and the anode electrode plate. However, when the cathode tab is being bent, the insulation layer requires more space at the head of the battery cell, resulting in an energy density loss of the battery cell.

SUMMARY

In view of this, it is necessary to provide a battery cell and an electric apparatus, to resolve the prior-art problems that battery cells and electric apparatuses cannot meet a temperature rise requirement for charging at a large rate and ensure a high energy density at the same time.

A technical solution according to an embodiment of this application is: a battery cell, including a first electrode plate, a second electrode plate, and a separator, where the separator is disposed between the first electrode plate and the second electrode plate, the battery cell is formed by winding the first electrode plate, the separator, and the second electrode plate, the first electrode plate includes a first current collector, a first active substance layer disposed on a surface of the first current collector, and at least one first tab; the first active substance layer is provided with a first groove, and the first tab is disposed in the first groove and electrically connected to the first current collector; the second electrode plate includes a second current collector, a second active substance layer disposed on a surface of the second current collector, and at least one second tab; and the second tab and the second current collector are integrally formed.

The first electrode plate uses an embedded tab structure, and the second electrode plate uses an external tab structure. With the embedded tab, it is unnecessary to reserve an uncoated region for welding a tab on the electrode plate. The external tab occupies no space for the active substance layer on the electrode plate. Both the embedded tab and the external tab can improve the energy density of the battery cell.

In some embodiments, the first tab is provided in a quantity of 1 to 10. In some embodiments, 1, 2, 3, 4, 5, 6, 7, 8, 9 or 10 first tabs are selected. A plurality of the first tabs can increase the quantity of current channels for the first electrode plate, so that the internal resistance of the battery cell is reduced and the temperature rise during charging is low, satisfying the temperature rise demand during charging/discharging at a high rate. In some embodiments, when the first tab is provided in a quantity greater than 1, projections of the first tabs overlap in a thickness direction of the battery cell. In this way, the first tabs that overlap are bent and welded to a connecting piece, and the connecting piece extends out of the packaging bag.

In some embodiments, when the first tab is provided in a quantity greater than 1, in a thickness direction of the battery cell, projections of some of the plurality of first tabs overlap each other, and projections of the other first tabs do not overlap each other. Because the embedded tab is implemented with a groove dug in the electrode plate, the thickness of a region of the electrode plate at which the embedded tab is located is generally less than a normal thickness of the electrode plate. In the thickness direction of the battery cell, if the quantity of embedded tabs that overlap is greater than a specified number, the thickness of the battery cell in the overlapping region will be too small, such that the battery cell interface is bad and at risk of lithium precipitation.

In some embodiments, the first tabs are disposed on a same side of a winding surface of the battery cell. In this way, when the battery cell is being packaged with an aluminum-plastic film, the first tabs can extend out of the packaging bag without being overly bent.

In an embodiment, the first tab includes one first tab, and in a length direction of the first electrode plate, a distance from the one first tab to one end of the first electrode plate is one-third to two-thirds of a length of the first electrode plate.

In an embodiment, the first tab includes one first tab, and in a length direction of the first electrode plate, a distance from the first tab to one end of the first electrode plate is half of a length of the first electrode plate.

In an embodiment, the at least one first tab includes two first tabs, and in a length direction of the first electrode plate, distances from the two first tabs to one end of the first electrode plate are one-fourth to three-fourths of a length of the first electrode plate.

In an embodiment, the at least one first tab includes two first tabs, and in a length direction of the first electrode plate, distances from the first tabs to one end of the first electrode plate are one-third and two-thirds of a length of the first electrode plate, respectively.

This means that the first tabs are disposed in relatively middle positions of the first electrode plate, which can overcome defects caused by expansion of the electrode plate in a case that the groove is located at the end of the electrode plate, for example, regions around the groove are not tightly bonded, the thickness changes greatly, and the film is prone to fall off. In addition, the first electrode plate is divided by the first tabs into several parts that are connected in parallel, reducing the current passing through each part of the electrode plate and the amount of heat generated by the battery.

In an embodiment, the first electrode plate is a cathode electrode plate. Because the first tab is an embedded tab, no insulation layer needs to be disposed at the edge of the cathode electrode plate, so that a wider active substance layer can be provided on the first electrode plate. This means that a width of the first electrode plate is greater than a width of an electrode plate provided with an insulation layer, and A/C overhang (in a normal case, a width of an anode electrode plate is greater than a width of the cathode electrode plate, and A/C overhang is a difference between the width of the anode electrode plate and the width of the cathode electrode plate) is reduced, thereby helping improve an energy density of the battery cell.

In some embodiments, the at least one second tab includes a plurality of second tabs. In some embodiments, the second tab may alternatively be provided in a quantity of 1 to N, for example 1, 2, 3, 4, 5, 6, 7, or 8, where N is a quantity of layers of the second electrode plate in the thickness direction of the battery cell. In an embodiment, in a thickness direction of the battery cell, each layer of the second electrode plate is provided with one such second tab. A plurality of the second tabs can increase the quantity of current channels for the second electrode plate, so that the internal resistance of the battery cell is reduced and the temperature rise during charging is low, satisfying the temperature rise demand during charging/discharging at a high rate.

In some embodiments, the second tabs are disposed on a same side of a winding surface of the battery cell. In this way, when the battery cell is being packaged with an aluminum-plastic film, the second tabs can extend out of the packaging bag without being overly bent.

In an embodiment, when the second tab is provided in a quantity greater than 1, projections of the second tabs overlap in a thickness direction of the battery cell. In this way, the second tabs that overlap are bent and welded to a connecting tab, and the connecting tab extends out of the packaging bag.

In an embodiment, the second electrode plate is an anode electrode plate. The edge of the anode electrode plate is provided with no insulation layer. In addition, the anode electrode plate is provided with a plurality of current channels, so that the internal resistance of the battery cell is reduced, and the temperature rise during charging is low, satisfying the temperature rise demand during charging/discharging at a high rate.

This application further provides an electric apparatus, where the electric apparatus includes the battery cell according to any one of the foregoing embodiments.

BRIEF DESCRIPTION OF DRAWINGS

The following further describes this application in detail with reference to the accompanying drawings and specific embodiments.

Figure 1:
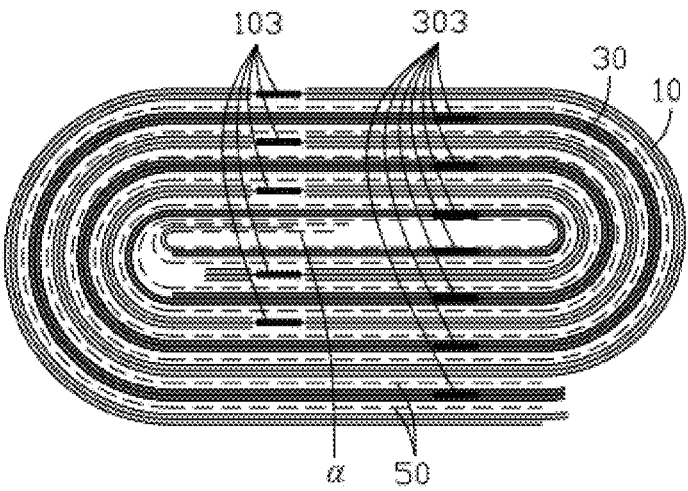
FIG. 1 is a schematic diagram of a winding structure of a battery cell according to an embodiment of this application.
Figure 1:
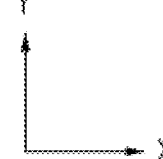

Reference signs of main components:

Battery cell 100
First electrode plate 10
Second electrode plate 30
Separator 50
First current collector
First active substance layer 102
First tab 103
First groove 104
Second current collector 301
Second active substance layer 302
Second tab 303
Insulation layer 500
First direction X
Second direction Y
Third direction Z
Winding surface α

Embodiments of this application will be further described with reference to the accompanying drawings in the following specific embodiments.

DETAILED DESCRIPTION

Unless otherwise defined, all technical and scientific terms used herein shall have the same meanings as commonly understood by those skilled in the art to which embodiments of this application belong. The terms used in this specification are merely intended to describe specific embodiments but not intended to constitute any limitation on the embodiments of this application.

Spatial related terms such as "above" may be used herein for ease of description to describe the relationship between one element or feature and another element (a plurality of elements) or feature (a plurality of features) as illustrated in the figure. It should be understood that spatial related terms are intended to encompass different orientations of a device or an apparatus in use or operation in addition to the orientations depicted in the figures. For example, if the device in the figures is turned over, elements described as "above" or "on" other elements or features would then be oriented "below" or "under" the other elements or features. Thus, the example term "above" may encompass both orientations of above and below.

It should be understood that although terms such as first, second, and third may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer or section discussed below could be termed a second element, component, region, layer or section without departing from the teachings of the example embodiments.

Referring to FIG. 1, this application provides a battery cell 100, including a first electrode plate 10, a second electrode plate 30, and a separator, where the separator is disposed between the first electrode plate 10 and the second electrode plate 30, and the battery cell 100 is formed by winding the first electrode plate 10, the separator, and the second electrode plate 30. As shown in FIG. 1, a width direction of the battery cell 100 is defined as a first direction X, and a thickness direction of the battery cell 100 is defined as a second direction Y. As shown in FIG. 2 to FIG. 5, a length direction of the battery cell 100 (that is, a width direction of the first electrode plate 10 or the second electrode plate 30) is defined as a third direction Z.

Figure 2:
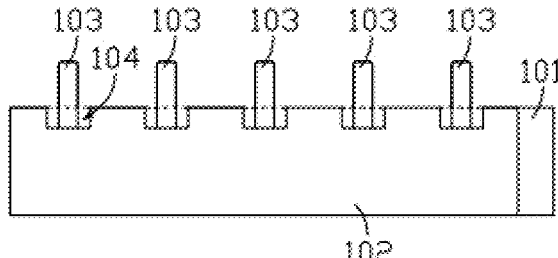
FIG. 2 is a schematic structural diagram of a first electrode plate according to an embodiment of this application.
Figure 2:
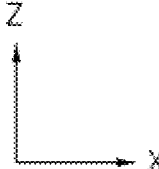

Referring to FIG. 2, the first electrode plate 10 includes a first current collector 101, a first active substance layer 102 disposed on a surface of the first current collector 101, and a first tab 103. The first active substance layer 102 is provided with a first groove 104, and the first tab 103 is disposed in the first groove 104 and electrically connected to the first current collector 101, which means that the first tab 103 is an embedded tab.

Figure 3:
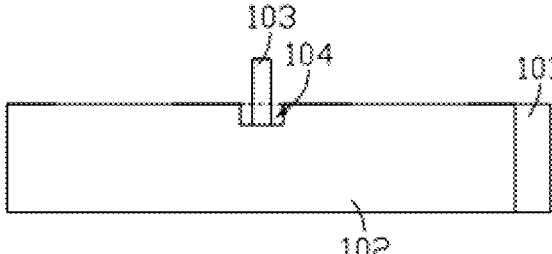
FIG. 3 is a schematic structural diagram of a first electrode plate according to an embodiment of this application.
Figure 3:
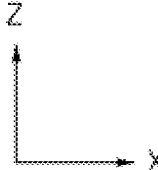

In some embodiments, the first tab 103 is provided in a quantity of 1 to 10. In some embodiments, as shown in FIG. 3, the first tab 103 includes one first tab, and in a length direction of the first electrode plate 10 (that is, the first direction X), a distance from the first tab 103 to one end of the first electrode plate 10 is one-third to two-thirds of a length of the first electrode plate 10. In a specific embodiment, the distance is selected to be half of the length, that is, the first tab 103 is located approximately in the middle of the first electrode plate 10 in the first direction X.

Figure 4:
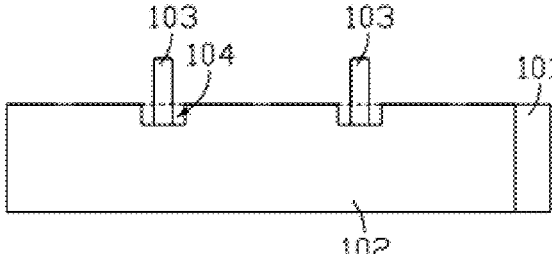
FIG. 4 is a schematic structural diagram of a first electrode plate according to an embodiment of this application.
Figure 4:
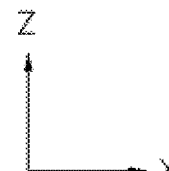

In some embodiment, the at least one first tab 103 includes two first tabs, and in a length direction of the first electrode plate 10, distances from the first tabs 103 to one end of the first electrode plate 10 are one-fourth to three-fourths of the length of the first electrode plate 10. Referring to FIG. 4, in a specific embodiment, the at least one first tab includes two first tabs, and in the first direction X, distances from the first tabs 103 to one end of the first electrode plate 10 are one-third and second-thirds of the length of the first electrode plate 10, respectively, which means that the two first tabs 103 are arranged approximately equally spaced in the first direction X of the first electrode plate 10. In this way, the first electrode plate 10 is divided by the first tabs 103 into three parts that are connected in parallel, reducing the current passing through each part of the first electrode plate 10 and the amount of heat generated by the battery.

In this application, the length of the first electrode plate refers to a length of the first active substance layer 102 in the first direction X, that is, a length excluding the uncoated region (the first current collector 101 coated with no first active substance layer 102); and one end of the first electrode plate refers to the starting or terminating end of the first active substance layer 102.

Figure 5:
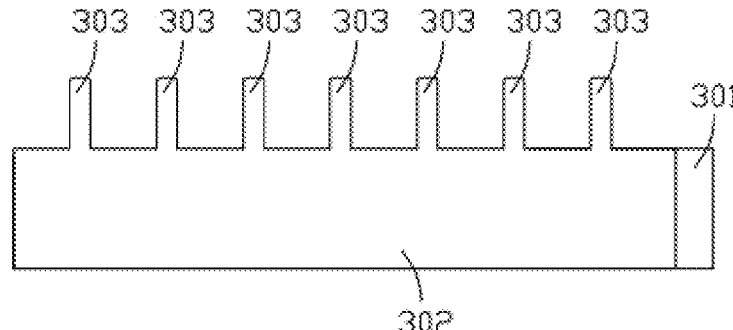
FIG. 5 is a schematic structural diagram of a second electrode plate according to an embodiment of this application.
Figure 5:
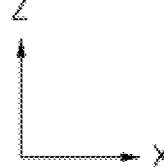

Referring to FIG. 5, the second electrode plate 30 includes a second current collector 301, a second active substance layer 302 disposed on a surface of the second current collector 301, and second tabs 303, where the second tabs 303 and the second current collector 301 are integrally formed, which means that the second tabs 303 are external tabs.

Figure 6:
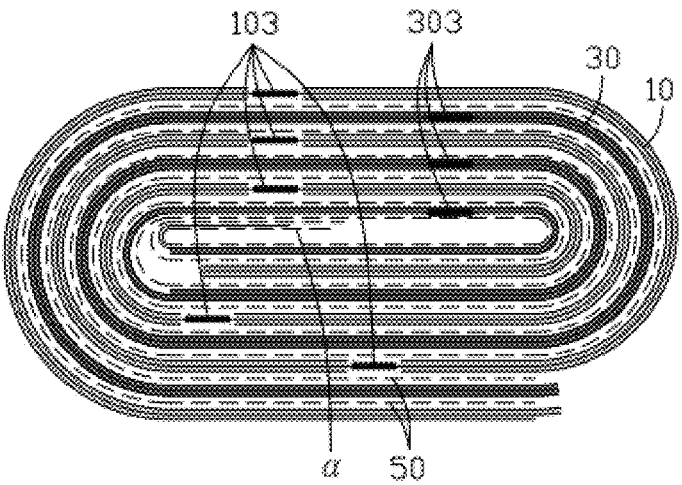
FIG. 6 is a schematic diagram of a winding structure of a battery cell according to an embodiment of this application.
Figure 6:

In some embodiments, as shown in FIG. 6, in the thickness direction of the battery cell 100 (that is, the second direction Y), projections of three of the first tabs 103 overlap each other, and projections of two of the first tabs 103 do not overlap each other. The first tabs 103 are embedded tabs, and if the quantity of embedded tabs that overlap is greater than a specified number, the thickness of the battery cell in the overlapping region will be too small, easily leading to a bad battery cell interface and a risk of lithium precipitation. In addition, referring to FIG. 8, the first tabs 103 are disposed on a same side of the winding surface of the battery cell 100. In this way, the first tabs 103 can extend out of the housing (not shown in the figure) without being overly bent, facilitating packaging of the housing. In this application, the winding surface α of the battery cell 100 refers to a plane at which the innermost separator is located. In some embodiments, the second tab 303 is provided in a quantity of at least 1. In some embodiments, the second tab 303 may alternatively be provided in a quantity of 1 to N, where N is a quantity of layers of the second electrode plate in the thickness direction of the battery cell. As shown in FIG. 1, the battery cell 100 includes 7 such second tabs, and in the second direction Y, the second electrode plate 30 has a total of 7 layers (that is, N=7), and each layer of the second electrode plate 30 is provided with one such second tab 303. In this way, the temperature rise during charging/discharging at a rate at each layer of the electrode plate is similar, helping make full use of the performance of each layer of the electrode plate. In this application, each circle formed by winding the second electrode plate 30 has two layers of the second electrode plate 30 in the thickness direction of the battery cell 100.

In an embodiment, as shown in FIG. 6, the second tabs 303 are disposed on a same side of the winding surface a of the battery cell 100. In addition, the second tabs 303 and the first tabs 103 are all disposed on the same side of the winding surface a of the battery cell 100. In this way, when the battery cell 100 is being packaged with an aluminum-plastic film, the second tabs 303 and the first tabs 103 can all extend out of the housing (not shown in the figure) without being overly bent, facilitating packaging of the housing.

In some embodiments, as shown in FIG. 1 and FIG. 6, when the second tab 303 is provided in a quantity greater than 1, projections of the second tabs 303 overlap in the second direction Y. In this way, the second tabs 303 that overlap are bent and welded to a connecting piece, and the connecting piece extends out of the housing.

In a specific embodiment, the first electrode plate 10 is a cathode electrode plate 10, and the second electrode plate 30 is an anode electrode plate 10. Further, the first electrode plate 10 is provided with one such first tab 103, and the second electrode plate is provided with one such second tab 303. The edge of the cathode electrode plate is provided with no insulation layer. Compared with a cathode electrode plate provided with an insulation layer in the prior art, the cathode electrode plate of this application has a wider active substance layer, which can improve the energy density of the battery cell.

In a specific embodiment, the first electrode plate 10 is a cathode electrode plate, and the second electrode plate 30 is an anode electrode plate. Further, the first electrode plate 10 is provided with one such first tab 103, and the second electrode plate is provided with a plurality of such second tabs 303. The anode electrode plate provided with a plurality of second tabs has a plurality of current channels, satisfying the temperature rise demand during charging/discharging at a high rate.

In a specific embodiment, the first electrode plate 10 is a cathode electrode plate, and the second electrode plate 30 is an anode electrode plate. Further, the first electrode plate 10 is provided with a plurality of such first tabs 103, and the second electrode plate is provided with one such second tab 303. The cathode electrode plate is provided with a plurality of current channels, which can improve the energy density of the battery cell, and satisfy the temperature rise demand during charging at a high rate.

In a specific embodiment, the first electrode plate 10 is a cathode electrode plate, and the second electrode plate 30 is an anode electrode plate. Further, the first electrode plate 10 is provided with a plurality of such first tabs 103, and the second electrode plate is provided with a plurality of such second tab 303. In this way, both the cathode electrode plate and the anode electrode plate have a plurality of current channels, satisfying the temperature rise demand during charging at a high rate.

In the prior art, generally the bare current collector at the edge of a cathode electrode plate is provided with an insulation coating to prevent fins from being generated when the tab is formed by die-cutting. The tail of the cathode tab is also provided with an insulation coating to prevent a short circuit caused by contact between the cathode tab and the anode electrode plate. However, when the cathode tab is being bent, the insulation layer requires more space at the head of the battery cell, resulting in an energy density loss of the battery cell. In this application, the cathode electrode plate uses the embedded tab, and the edge of the electrode plate and the tail of the tab are provided with no insulation layer. Therefore, the tab provided at the cathode electrode plate can be bent, requiring less space at the head of the battery cell than that in the prior art, and reducing the PA gap (a distance between the housing and the anode electrode plate), thereby increasing the energy density of the battery cell. In addition, a wider active substance layer can be provided on the cathode electrode plate. This means that a width of the cathode electrode plate is greater than a width of a cathode electrode plate provided with an insulation layer, and A/C overhang (in a normal case, a width of an anode electrode plate is greater than a width of the cathode electrode plate, and A/C overhang is a difference between the width of the anode electrode plate and the width of the cathode electrode plate) is reduced, thereby helping improve an energy density of the battery cell.

The following will further describe this application with reference to specific examples.

Example 1

Preparation of a cathode electrode plate (a first electrode plate 10): A first active substance layer 102 with lithium cobalt oxide as a main material was applied on a first surface and a second surface of a first current collector 101 (aluminum foil) that are opposite each other, and a surface density of the single-sided coating (without the current collector) was 0.167 g/1500 mm², where a coating length of the first surface was 842 mm, and a coating length of the second surface was 745 mm. A first groove 104 was made into the first active substance layer 102. A first tab 103 (that is, a cathode tab) was disposed in the first groove 104 and electrically connected to the first current collector 101, and the first groove 104 was covered with insulating tapes on both sides of the first tab 103. The cathode tab was provided in a quantity of 1, and the cathode tab was located approximately in the middle position of a length of the cathode electrode plate (excluding a length of an uncoated region).

Preparation of an anode electrode plate (a second electrode plate 30): A second active substance layer 302 with graphite as a main material was applied on a third surface and a fourth surface of a second current collector 301 (copper foil) that are opposite each other, and a surface density of the single-sided coating (without the current collector) was 0.09 g/1500 mm², where a coating length of the third surface was 844 mm, and a coating length of the fourth surface was 791 mm. Ten second tabs (that is, anode tabs) were arranged regularly spaced from each other on the second current collector 301 by laser die-cutting, and projections of the second tabs overlapped each other in a thickness direction of a battery cell 100.

Figure 7:
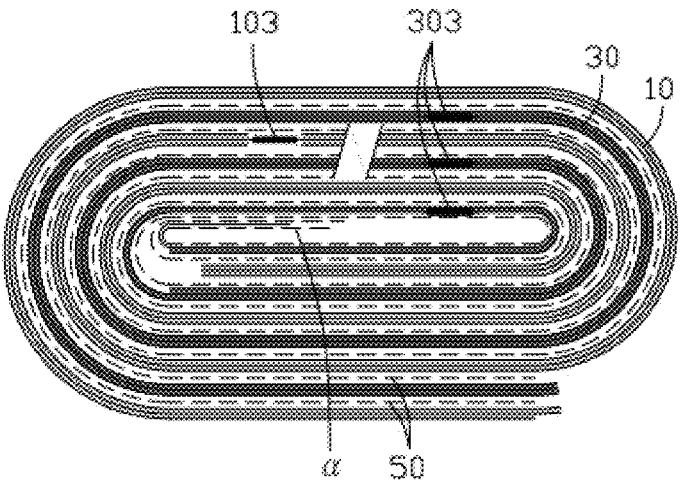
FIG. 7 is a schematic diagram of a winding structure of a battery cell according to example 1 of this application.
Figure 7:

The battery cell 100 was formed by winding the above prepared cathode electrode plate, a separator, and the above prepared anode electrode plate, as shown in FIG. 7.

Example 2

Figure 8:
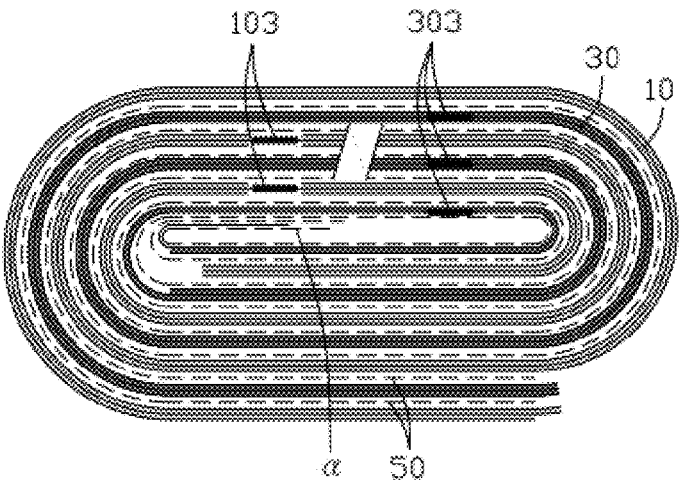
FIG. 8 is a schematic diagram of a winding structure of a battery cell according to example 2 of this application.
Figure 8:
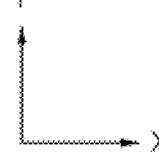

The difference from example 1 was that: As shown in FIG. 8, two first tabs 103 were provided, and the tabs were disposed at positions corresponding to one-third and two-thirds of a length of the cathode electrode plate (excluding the length of the uncoated region).

Comparative Example 1

Figure 9:
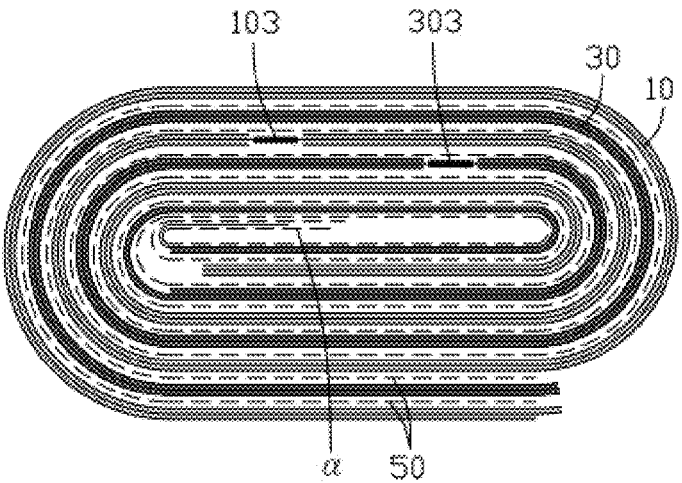
FIG. 9 is a schematic diagram of a winding structure of a battery cell according to comparative example 1 of this application.
Figure 9:

The difference from example 1 was that: As shown in FIG. 9, one second tab 303 was provided; and the second tab 303 was arranged in a way similar to the first tab 103. To be specific, a second groove was made into the second active substance layer 302, the second tab 303 (that is, the anode tab) was disposed in the second groove and electrically connected to the second current collector 301, and the second groove was covered with insulating tapes on both sides of the second tab 303. One second tab was provided, and the one second tab was located in approximately the middle position of a length of the anode electrode plate (excluding a length of an uncoated region).

Comparative example 2

Figure 10:
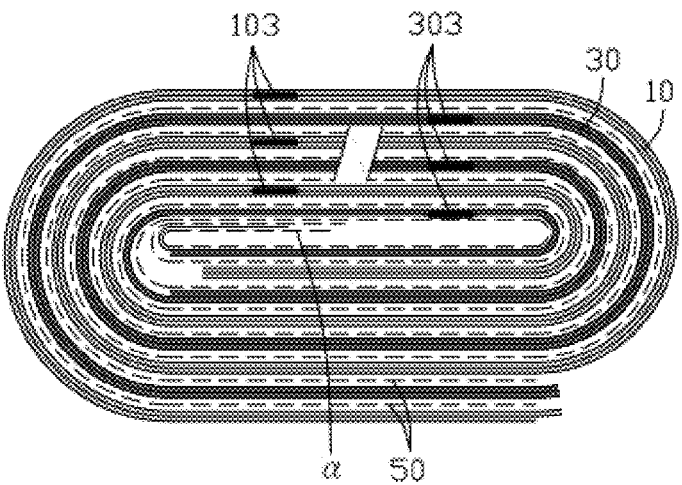
FIG. 10 is a schematic diagram of a winding structure of a battery cell according to comparative example 2 of this application.
Figure 10:
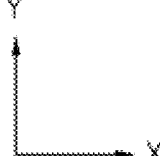

The difference from example 1 was that: As shown in FIG. 10, the first tab 103 was an external tab provided in a quantity of 10, and in a thickness direction of the battery cell 100, projections of the first tabs 103 overlapped each other. The first tabs 103 were arranged in a way similar to the second tabs 303. To be specific, ten first tabs 103 (that is, cathode tabs) were arranged regularly spaced from each other on the first current collector 101 by laser die-cutting. In this comparative example, the edge of the first electrode plate 10 (that is, the cathode electrode plate) was provided with an insulation layer on the same side as the first tabs 103, and the tail of each first tab 103 (a part connected to the first current collector 101) was also provided with an insulation layer.

Capacity of the battery cell 100 was calculated according to the following equation:

Capacity=(width of cathode electrode plate×(coating length of first surface+coating length of second surface)−adhesive area)×surface density of cathode electrode plate×gram capacity of cathode electrode plate (that is, 170 mAh/g), where the adhesive area=quantity of embedded tabs×20 mm×28 mm×2.

A temperature rise test was performed for the battery cell 100 as follows:

At an ambient temperature of 25° C., the battery cell 100 was charged at a constant current of 6C to 4.2 V, then charged at a constant current of 5C to 4.32 V, then charged at a constant current of 3C to 4.5 V, and then charged at a constant voltage of 4.5 V to 0.1C. The body temperature of the battery cell 100 during charging was monitored and recorded. Temperature rise =highest body temperature during charging−ambient temperature.

For parameter settings and test results of the examples and comparative examples, see Table 1.

and the at least one second tab are located on a same side of a winding surface of the battery cell.

4. The battery cell according to claim 1, wherein in a thickness direction of the battery cell, each layer of the second electrode plate is provided with one second tab.

TABLE 1

| | Cathode tab arrangement | Width of cathode electrode plate (mm) | Quantity of cathode tabs | Anode tab arrangement | Width of anode electrode plate (mm) | Quantity of anode tabs | Temperature rise (° C.) | Capacity (mAh) | Precipitation? |
|---|---|---|---|---|---|---|---|---|---|
| Example 1 | Embedded | 68.7 | 1 | External | 69.9 | 10 | 14.2 | 1989 | No |
| Example 2 | Embedded | 68.7 | 2 | External | 69.9 | 10 | 14 | 1968 | No |
| Comparative Example 1 | Embedded | 70 | 1 | Embedded | 71.1 | 1 | 20 | 2027 | No |
| Comparative Example 2 | External | 67 | 10 | External | 68.5 | 10 | 13.8 | 1939 | No |

It can be seen from Table 1 that, compared with comparative example 1 in which the cathode electrode plate and the anode electrode plate were each provided with one embedded tab, in examples 1 and 2, the anode electrode plate of the battery cell was provided with a plurality of external tabs so that the temperature rise was smaller and the capacity was not significantly reduced. Compared with comparative example 2 in which the cathode electrode plate was provided with a plurality of cathode tabs, in examples 1 and 2, even though the cathode electrode plate used one embedded cathode tab or two embedded cathode tabs, the battery cell had no significant temperature rise, but had a larger capacity, that is, a higher energy density.

What is claimed is:

1. A battery cell, comprising: a first electrode plate, a second electrode plate and a separator; the first electrode plate is a cathode plate, and the second electrode plate is an anode electrode plate; wherein the separator is disposed between the first electrode plate and the second electrode plate; the battery cell is formed by winding the first electrode plate, the separator and the second electrode plate; the first electrode plate comprises a first current collector, a first active substance layer disposed on a surface of the first current collector and at least one first tab; the first active substance layer is provided with a first groove, and the first tab is disposed in the first groove and electrically connected to the first current collector; the second electrode plate comprises a second current collector, a second active substance layer disposed on a surface of the second current collector and at least one second tab; the at least one second tab and the second current collector are integrally formed; the at least one second tab includes a plurality of tabs; and the at least one first tab consists of one first tab, and in a length direction of the first electrode plate, a distance from the one first tab to one end of the first electrode plate is in a range of one-third to two-thirds of a length of the first electrode plate, or the at least one first tab consists of two first tabs, and in a length direction of the first electrode plate, distances of the two first tabs from one end of the first electrode plate are in the range of one-third to two-thirds of the length of the first electrode plate.

2. The battery cell according to claim 1, wherein in a thickness direction of the battery cell, projections of some of the plurality of first tabs overlap each other, and/or projections of all of the plurality of second tabs overlap each other.

3. The battery cell according to claim 1, wherein in a thickness direction of the battery cell, the at least one first tab 5. The battery cell according to claim 1, wherein the first tab consists of the one first tab; and in the length direction of the first electrode plate, the distance from the one first tab to the one end of the first electrode plate is half of the length of the first electrode plate.

6. An electric apparatus, comprising a battery cell, the battery cell comprising a first electrode plate, a second electrode plate, and a separator, the first electrode plate is a cathode plate, and the second electrode plate is an anode electrode plate; wherein the separator is disposed between the first electrode plate and the second electrode plate; the battery cell is formed by winding the first electrode plate, the separator and the second electrode plate; the first electrode plate comprises a first current collector, a first active substance layer disposed on a surface of the first current collector and at least one first tab; the first active substance layer is provided with a first groove, and the first tab is disposed in the first groove and electrically connected to the first current collector; the second electrode plate comprises a second current collector, a second active substance layer disposed on a surface of the second current collector and at least one second tab; the at least one second tab and the second current collector are integrally formed; the at least one second tab includes a plurality of tabs; and the at least one first tab consists of one first tab, and in a length direction of the first electrode plate, a distance from the one first tab to one end of the first electrode plate is in a range of one-third to two-thirds of a length of the first electrode plate, or the at least one tab consists of two first tabs, and in a length direction of the first electrode plate, distances of the two first tabs from one end of the first electrode plate are in the range of one-third to two-thirds of the length of the first electrode plate.

7. The electric apparatus according to claim 6, wherein in a thickness direction of the battery cell, projections of some of the plurality of first tabs overlap each other, and/or projections of all of the plurality of second tabs overlap each other.

8. The electric apparatus according to claim 6, wherein in a thickness direction of the battery cell, the at least one first tab and the at least one second tab are located on a same side of a winding surface of the battery cell.

9. The electric apparatus according to claim 6, wherein in a thickness direction of the battery cell, each layer of the second electrode plate is provided with one second tab.

10. The electric apparatus according to claim 6, wherein the first tab consists of the one first tab; and in the length direction of the first electrode plate, the distance from the one first tab to the one end of the first electrode plate is half of the length of the first electrode plate.

* * * * *